March 11, 1930.  C. R. KOEHLER  1,750,478

WHEEL

Filed Feb. 14, 1927

INVENTOR.
C. R. Koehler.
BY J. Edward Marbee.
ATTY.

Patented Mar. 11, 1930

1,750,478

UNITED STATES PATENT OFFICE

CONRAD ROBERTSON KOEHLER, OF TORONTO, ONTARIO, CANADA

WHEEL

Application filed February 14, 1927. Serial No. 168,027.

This invention relates to wheels such as used on automobiles, motor trucks and the like. With these wheels are employed pneumatic tires. The standard practice up to a few years ago was to make these tires comparatively small and inflate them to a high pressure. During the last two or three years a larger tire, commonly known as the balloon tire, has come into common use, the pressure employed when the tire is inflated being considerably less than that of the earlier tires.

It is evident, of course, that riding will be more enjoyable if still larger tires could be employed, but with the present method of applying the tires to the wheels the size of the tire which it is possible to employ has practically reached the limit: as the use of larger tires results in side sway of the vehicle, to say nothing of the strain on the walls of the tire when the vehicle is travelling.

My object therefore is to devise a connection between a wheel and tire whereby a very much larger tire than any at present in use may be employed so that the advantages of the larger air cushion may be obtained without any objectionable side sway of the vehicle while in motion.

Figure 1:
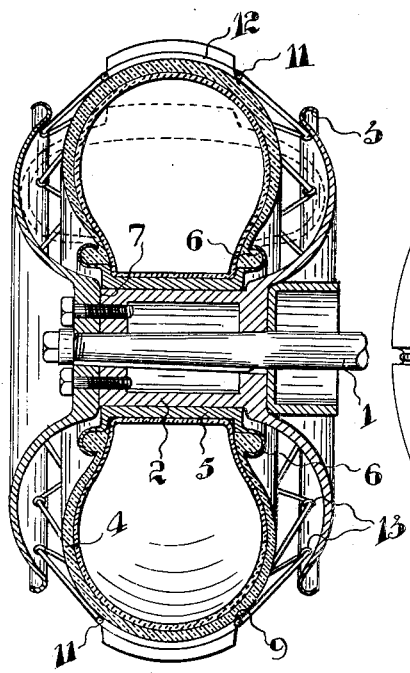
Figure 2:
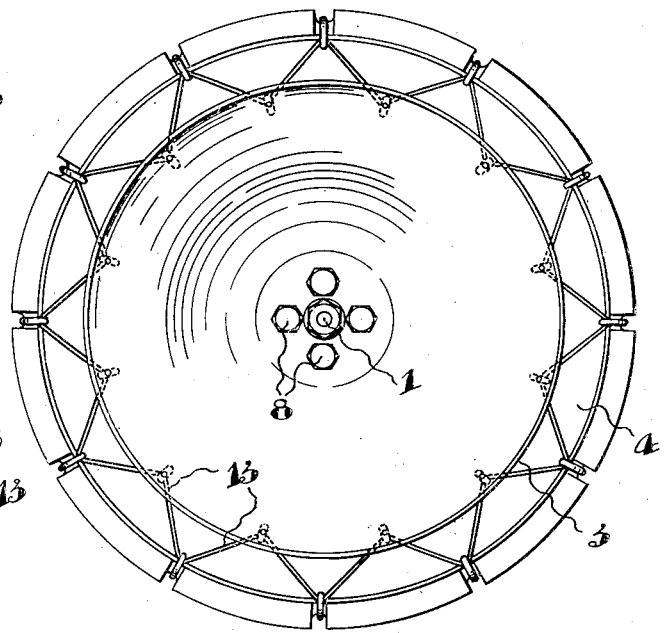

I attain my object by providing a direct drive connection between the hub and the tread of the tire and utilize said connections as a means for supporting the tire to prevent side sway. The invention is hereinafter more fully described and illustrated in the accompanying drawings in which Fig. 1 is a section through a wheel and tire constructed in accordance with my invention;

Fig. 2 a side view of the wheel and tire; and

Figure 3:
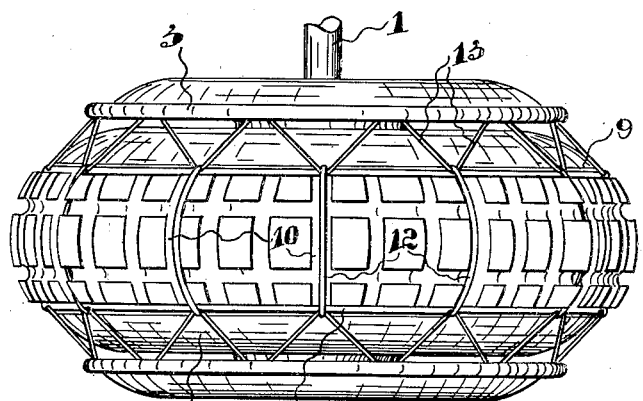

Fig. 3 a plan view of the same.

In the drawings like numerals of reference indicate corresponding parts in the different figures.

1 indicates the axle of the vehicle on which the wheel is mounted. The wheel comprises a hub 2 provided with outwardly extending guard members 3 forming between them an annular recess in which the tire 4 is positioned.

In the bottom of this channel is placed an annular channel member 5, which is preferably provided with inwardly directed flanges 6 to engage the beads of the tire. This member 5 is preferably free to rotate on the hub.

In order that the member 5 and tire 4 may be placed in position, the hub is divided on the line 7 and the parts secured together in any suitable manner, such as by the cap screws 8.

It will be apparent from Fig. 1 of the drawing that the tire extends from the periphery of the wheel to a point close to the hub, thus doing away with spokes or their equivalent employed in ordinary wheel practice.

The member 5 could be secured to the hub and the connection between this member and the tire depended on to drive the vehicle, but the strain on the tire would be too great so that the tire would soon be destroyed. Further, there would be considerable side sway of the vehicle, particularly when turning corners or going around curves which would be dangerous.

I therefore, as before stated, prefer to leave the member 5 loose on the hub and apply the driving power directly to the tread portion of the tire, and as a convenient method of drive, I utilize the guards 3 for this purpose. The tread of the tire is provided with circumferential grooves 9 and transverse grooves 10. In the circumferential grooves 9 are positioned supporting cables 11 and in the grooves 10 are positioned transverse connecting cables 12, preferably connected with the cables 11, while connecting members 13 are provided connecting these cables 11 and 12 with the guards 3.

These grooves will be deep enough so that the cables will be out of contact with the road surface. It will thus be seen that when the hub is rotated, the movement is imparted through the guards 3 and cables 12 and 13 directly to the periphery of the tire and there is therefore no strain on the tire adjacent the member 5, or, in the case of the front wheel of a vehicle, movement is imparted from the tread of the tire directly to the hub through the same connections.

The cables 11 and 13, it will be seen, prevent side sway of the tire, which is an important feature of my invention. It is not necessary that the cables 11, 12 and 13 be arranged in the exact manner shown, as many other arrangements may be devised. The cables 13 are shown as continuous and threaded through eyes on the ends of the cables 12 and through holes in the guards.

The space between the guards 3 is sufficiently wide so that in the case of a soft tire, there is room to receive the tire as indicated in dotted lines at the upper part of Fig. 1. There is therefore little danger of damaging the tire, as the guards 3 will be made of sufficiently heavy material to support the vehicle.

It will be apparent that various advantages are derived from the use of the tire having abnormally large cross sectional area. In the first place greater deflection is possible and therefore larger irregularities in the road surface will be taken care of by the tire before the springs are called upon to take up the shock. Second, owing to the wide tread there is not the danger of sinking into soft places, and third, owing to the large surface of the tire which contacts with the road, the danger of skidding is considerably reduced.

From the above description it will be seen that I have devised a wheel which will satisfactorily attain the object of my invention as set out in the statement of invention in this specification.

What I claim is:

1. In a wheel, the combination of a hub; a tire-carrying member loose on said hub; a tire mounted on said member; and means independent of said tire-carrying member forming a direct drive connection between the hub and the tread portion of the tire.

2. In a wheel, the combination of a hub, a tire-carrying member loose on the hub; a pneumatic tire on said member; guard members secured to the hub, one at each side thereof and in spaced relationship to the tire; means for driving said tire from said guards comprising transverse tread engaging members, and securing means extending in opposite directions from each end of each tread engaging member and connected to the guards, said guards extending outwardly close to the tread line of the tire whereby the securing means lie at a small angle to the road surface.

3. In a wheel, the combination of a hub; a tire-carrying member loose on the hub; a pneumatic tire on said member; guard members secured to the hub, one at each side thereof and in spaced relationship to the tire; means for driving said tire from said guards comprising transverse tread engaging members and securing members arranged in zigzag form and connected alternately with the guards and the ends of the tread-engaging members, and lying at an effective draft angle to the direction of travel of the tread of the tire, said guards extending outwardly close to the tread line of the tire whereby the securing means lie at a small angle to the road surface.

Signed at Toronto, Can., this 8th day of February, 1927.

CONRAD R. KOEHLER.